US012534013B2

(12) United States Patent
Larson et al.

(10) Patent No.: US 12,534,013 B2
(45) Date of Patent: Jan. 27, 2026

(54) VEHICLE FRONT RADAR INTEGRATION

(71) Applicant: Indian Motorcycle International, LLC, Medina, MN (US)

(72) Inventors: Alec S. Larson, Wyoming, MN (US); Benjamin M. Comana, Burgdorf (CH); Tyson Anderson, Wyoming, MN (US); Jeffrey M. O'Halloran, Wyoming, MN (US); Richard J. Christoph, Medina, MN (US); Ronald A. Vorndran, Wyoming, MN (US); Kyle R. Kujawa, Medina, MN (US); Michael M. Song, Medina, MN (US); Olivier Béboux, Burgdorf (CH)

(73) Assignee: INDIAN MOTORCYCLE INTERNATIONAL, LLC, Medina, MN (US)

( * ) Notice: Subject to any disclaimer, the term of this patent is extended or adjusted under 35 U.S.C. 154(b) by 0 days.

(21) Appl. No.: 18/998,732

(22) PCT Filed: Mar. 27, 2024

(86) PCT No.: PCT/US2024/021653
§ 371 (c)(1),
(2) Date: Jan. 27, 2025

(87) PCT Pub. No.: WO2024/206423
PCT Pub. Date: Oct. 3, 2024

(65) Prior Publication Data
US 2025/0263009 A1 Aug. 21, 2025

Related U.S. Application Data

(60) Provisional application No. 63/456,025, filed on Mar. 31, 2023.

(51) Int. Cl.
*B60Q 1/00* (2006.01)
*B60Q 1/04* (2006.01)
(Continued)

(52) U.S. Cl.
CPC ............ *B60Q 1/0023* (2013.01); *B60Q 1/04* (2013.01); *G01S 13/931* (2013.01); *B62J 6/026* (2020.02);
(Continued)

(58) Field of Classification Search
CPC .............. B60Q 1/0023; B60Q 1/04; G01S 2013/93277; G01S 13/931; B62J 6/026; B62J 6/027; H01Q 1/42
See application file for complete search history.

(56) References Cited

U.S. PATENT DOCUMENTS 6,380,883 B1 * 4/2002 Bell ............... G01S 13/931
342/70
8,803,728 B2 * 8/2014 Yonemoto ............ H01Q 1/3225
362/539

(Continued)

FOREIGN PATENT DOCUMENTS

JP 2015123840 A * 7/2015

OTHER PUBLICATIONS

International Search Report and Written Opinion issued by the International Searching Authority, dated Jul. 11, 2024, for International Patent Application No. PCT/US2024/021653; 15 pages.
(Continued)

*Primary Examiner* — Peter M Bythrow
(74) *Attorney, Agent, or Firm* — SCHWEGMAN LUNDBERG & WOESSNER, P.A.

(57) ABSTRACT

A main lighting assembly for a vehicle may comprise a headlight including a lens and a sensor assembly. The sensor assembly may be positioned adjacent the headlight lens and
(Continued)

may include a forward-facing sensor unit positioned behind a sensor cover to sense objects in front of the vehicle. The headlight lens may include a recess and the sensor cover may include a portion that is substantially contiguous with the recess. The headlight lens and the sensor cover may be positioned within an opening of a front fairing of the vehicle and may define a substantially circular envelope.

21 Claims, 4 Drawing Sheets

(51) Int. Cl.
  *B62J 6/026* (2020.01)
  *B62J 6/027* (2020.01)
  *G01S 13/931* (2020.01)
(52) U.S. Cl.
  CPC ..... *B62J 6/027* (2020.02); *G01S 2013/93271* (2020.01); *G01S 2013/93277* (2020.01)

(56) References Cited

U.S. PATENT DOCUMENTS

| | | | | |
|---|---|---|---|---|
| 9,925,912 | B2* | 3/2018 | Zawacki | F21S 43/239 |
| 10,661,703 | B2* | 5/2020 | Hashimoto | B62J 6/023 |
| 11,248,767 | B2* | 2/2022 | Watano | B60Q 1/068 |
| 11,808,845 | B2* | 11/2023 | Lim | G01S 7/027 |
| 11,873,964 | B2* | 1/2024 | Maruyama | G01S 13/931 |
| 11,878,622 | B2* | 1/2024 | Katsurada | F21S 43/236 |
| 12,055,626 | B2* | 8/2024 | Katsurada | B60Q 1/0023 |
| 12,162,397 | B2* | 12/2024 | Watanabe | B60Q 1/0491 |
| 12,305,826 | B1* | 5/2025 | Nowicki | F21S 43/265 |
| 2008/0158045 | A1* | 7/2008 | Teranishi | B60Q 1/076 |
| | | | | 342/70 |
| 2008/0158897 | A1* | 7/2008 | Nakamura | G01S 13/931 |
| | | | | 342/73 |
| 2008/0180965 | A1* | 7/2008 | Nakamura | G01S 7/027 |
| | | | | 362/507 |
| 2009/0190323 | A1* | 7/2009 | Watanabe | B60Q 1/143 |
| | | | | 362/466 |
| 2010/0202154 | A1* | 8/2010 | Hamkens | F21S 41/275 |
| | | | | 264/1.32 |
| 2017/0158111 | A1* | 6/2017 | Zawacki | B60Q 1/2607 |
| 2019/0257922 | A1* | 8/2019 | McCord | G01S 17/931 |
| 2019/0283658 | A1* | 9/2019 | Furui | B60Q 1/0023 |
| 2019/0283659 | A1* | 9/2019 | Moerbe | B62J 45/4151 |
| 2019/0366908 | A1* | 12/2019 | Horn | B60Q 1/085 |
| 2020/0096612 | A1* | 3/2020 | Otoyo | F16J 15/52 |
| 2020/0101887 | A1* | 4/2020 | Cha | B60Q 1/34 |
| 2020/0300964 | A1* | 9/2020 | Kasaba | G01S 17/931 |
| 2020/0301012 | A1* | 9/2020 | Yamamoto | G01S 15/86 |
| 2020/0331552 | A1* | 10/2020 | Horn | B62J 6/024 |
| 2020/0377165 | A1* | 12/2020 | Rienmueller | F21V 23/0442 |
| 2021/0025560 | A1* | 1/2021 | Watano | B60Q 1/0683 |
| 2021/0061388 | A1* | 3/2021 | Maeda | F21S 41/30 |
| 2021/0061389 | A1* | 3/2021 | Kawamura | B62J 6/027 |
| 2021/0237819 | A1* | 8/2021 | Horn | B60Q 11/005 |
| 2022/0151030 | A1 | 5/2022 | Van Straten | |
| 2022/0316678 | A1* | 10/2022 | Maruyama | G01S 13/931 |
| 2023/0015642 | A1 | 1/2023 | Horn | |
| 2023/0062751 | A1* | 3/2023 | Katsurada | H01Q 1/42 |
| 2023/0264626 | A1* | 8/2023 | Hélot | F21S 43/50 |
| | | | | 315/82 |

OTHER PUBLICATIONS

"International Application Serial No. PCT/US2024/021653, International Preliminary Report on Patentability mailed Oct. 9, 2025", 8 pgs.

* cited by examiner

VEHICLE FRONT RADAR INTEGRATION

CROSS-REFERENCE TO RELATED APPLICATIONS

The present application is a national stage entry of International (PCT) Patent Application No. PCT/US2024/021653, filed Mar. 27, 2024, which claims the benefit of U.S. Provisional Application No. 63/456,025, entitled "VEHICLE FRONT RADAR INTEGRATION," filed on Mar. 31, 2023, which are incorporated by reference herein for all purposes in their entireies.

TECHNICAL FIELD

The present application relates generally to vehicle sensors and more particularly to mounting configurations for a forward facing radar sensor for a motorcycle.

BACKGROUND

Various vehicles, including motorcycles, include radar sensors for detecting the presence of objects within the sensing cone of the sensor. Such sensors typically require a forward facing mounting location on the vehicle that is unobstructed, which results is reduced aesthetic appeal of the vehicle as the sensor is obviously positioned for functional purposes. Thus, it would be desirable to mount a radar sensor in a compact, concealed manner that does not degrade the performance of the sensor.

SUMMARY

According to one embodiment, the disclosure provides a main lighting assembly for a vehicle, comprising: a headlight mounted to a frame of the vehicle, the headlight including a lens; a headlight bezel substantially surrounding the headlight and supported within an opening of a front fairing of the vehicle; and a sensor assembly positioned below the headlight lens and between the headlight bezel and the headlight to sense objects in front of the vehicle, the sensor assembly including a forward-facing sensor unit mounted to the vehicle and positioned behind a sensor cover; wherein the headlight lens includes an upper semi-circular edge and a lower recess and the sensor cover includes an upper protrusion that is substantially contiguous with the lower recess; and wherein the headlight lens and the sensor cover define a substantially circular envelope. In one aspect of this embodiment, the lower recess of the headlight lens includes a pair of lower edges extending from the upper semi-circular edge, a pair of lower angled edges extending from the pair of lower edges and a central lower edge. In a variant of this aspect, the upper protrusion of the sensor cover includes a pair of upper angled edges and a substantially flat upper edge extending between the upper angled edges, the upper angled edges being substantially contiguous with the lower angled edges of the headlight lens and the substantially flat upper edge being substantially contiguous with the central lower edge of the headlight lens. In another aspect, the main lighting assembly further comprises a pair of position lights positioned between an outer side wall of the headlight bezel and curved inner wall segments of the headlight bezel. In a further variant, the pair of position lights are positioned outside the substantially circular envelope. In another variant, each of the pair of position lights includes a lower portion that tapers along a curved defined by an outer wall of the headlight bezel and an upper portion that extends from the lower portion at a step between the lower portion and the upper portion. In another aspect, the headlight lens and the sensor cover are symmetric about a centerline of the vehicle. In yet another aspect, the headlight bezel includes an outer wall that surrounds the headlight, the outer wall including tapering ends adjacent a curved lower edge of the sensor cover. In another aspect, the headlight bezel includes an outer wall that surrounds the headlight, an a pair of curved inner wall segments that are substantially contiguous with the upper semi-circular edge of the headlight lens. In still another aspect, the headlight bezel includes a pair of substantially triangular forward walls extending from the curved inner wall segments, the substantially triangular forward walls being positioned adjacent corresponding lower edges of the headlight lens and corresponding curved vertical edges of the sensor cover. In another aspect, the headlight lens includes a convex outer surface and the sensor cover includes a convex outer surface, the convex outer surface of the headlight lens has a curvature that is substantially continuous with a curvature of the convex outer surface of the sensor cover. In another aspect, the forward-facing sensor unit is a radar unit.

According to another embodiment of the present disclosure, a main lighting assembly for a vehicle is provided, comprising: a headlight including a lens; and a sensor assembly positioned below the headlight lens and including a forward-facing sensor unit positioned behind a sensor cover to sense objects in front of the vehicle; wherein the headlight lens includes a lower recess and the sensor cover includes an upper protrusion that is substantially contiguous with the lower recess; and wherein the headlight lens and the sensor cover are positioned within an opening of a front fairing of the vehicle and define a substantially circular envelope. In one aspect of this embodiment, the lower recess of the headlight lens includes a pair of lower edges extending from an upper semi-circular edge of the headlight lens, a pair of lower angled edges extending from the pair of lower edges and a central lower edge. In a variant of this aspect, the upper protrusion of the sensor cover includes a pair of upper angled edges and a substantially flat upper edge extending between the upper angled edges, the upper angled edges being substantially contiguous with the lower angled edges of the headlight lens and the substantially flat upper edge being substantially contiguous with the central lower edge of the headlight lens. In another aspect, the headlight lens and the sensor cover are symmetric about a centerline of the vehicle. Another aspect further comprises a headlight bezel including an outer wall that substantially surrounds the headlight, the outer wall including tapering ends adjacent a curved lower edge of the sensor cover. In another aspect, the headlight lens includes a convex outer surface and the sensor cover includes a convex outer surface, the convex outer surface of the headlight lens has a curvature that is substantially continuous with a curvature of the convex outer surface of the sensor cover. In another aspect, the forward-facing sensor unit is a radar unit.

Another embodiment of the present disclosure provides a main lighting assembly for a vehicle, comprising: a headlight including a lens; and a sensor assembly positioned above the headlight lens and including a forward-facing sensor unit positioned behind a sensor cover to sense objects in front of the vehicle; wherein the headlight lens includes an upper recess and the sensor cover includes an lower protrusion that is substantially contiguous with the upper recess; and wherein the headlight lens and the sensor cover are positioned within an opening of a front fairing of the vehicle and define a substantially circular envelope.

Still another embodiment of the present disclosure provides a main lighting assembly for a vehicle, comprising: a headlight including a lens; and a sensor assembly positioned adjacent the headlight lens and including a forward-facing sensor unit positioned behind a sensor cover to sense objects in front of the vehicle; wherein the headlight lens includes a recess and the sensor cover includes a portion that is substantially contiguous with the recess; and wherein the headlight lens and the sensor cover are positioned within an opening of a front fairing of the vehicle and define a substantially circular envelope.

BRIEF DESCRIPTION OF THE DRAWINGS

The above mentioned and other features of this disclosure, and the manner of attaining them, will become more apparent and the disclosure itself will be better understood by reference to the following description of embodiments of the disclosure taken in conjunction with the accompanying drawings, wherein.

Corresponding reference characters may indicate corresponding parts throughout the several views.

DETAILED DESCRIPTION OF THE DRAWINGS

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the structures and components disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. While the present disclosure primarily involves a touring motorcycle, it should be understood, that the disclosure may have application to other types of vehicles such as all-terrain vehicles, motorcycles, watercraft, utility vehicles, scooters, golf carts, and mopeds.

Figure 1:
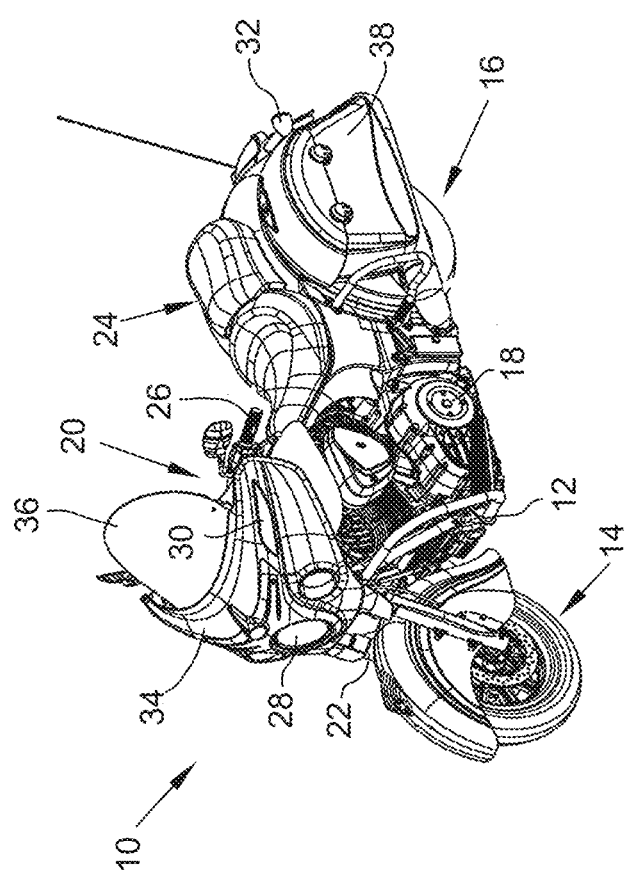
FIG. 1 is a perspective view of a vehicle that may incorporate the teachings of the present disclosure.

With reference first to FIG. 1, an illustrative embodiment of a two-wheeled vehicle 10 is shown. The vehicle 10 as illustrated is a touring style motorcycle although the majority of components may be used for a cruiser style motorcycle.

The vehicle 10 generally includes a frame 12 supported by ground engaging members, namely a front ground engaging member or wheel 14 and a rear ground engaging member or wheel 16. The vehicle 10 travels relative to the ground on the front wheel 14 and the rear wheel 16.

The rear wheel 16 is coupled to a power train assembly 18, to propel the vehicle 10 through the rear wheel 16. It will be appreciated that while the vehicle 10 is illustrated as a two-wheel vehicle, various embodiments of the present teachings are also operable with three, four, six, etc. wheeled vehicles.

The vehicle 10 also generally includes a steering assembly 20, front suspension 22, rear suspension (not shown), and seat 24. The steering assembly 20 includes handlebars 26 which may be moved by an operator to rotate front the front wheel 14 either to the left or the right. The vehicle further includes safety systems such as a main lighting assembly 28, front turn signals 30, and rear turn signals 32. Ergonomic systems may include a front fairing 34, a windshield assembly 36 and a saddlebag assembly 38.

Figures 2A, 2B:
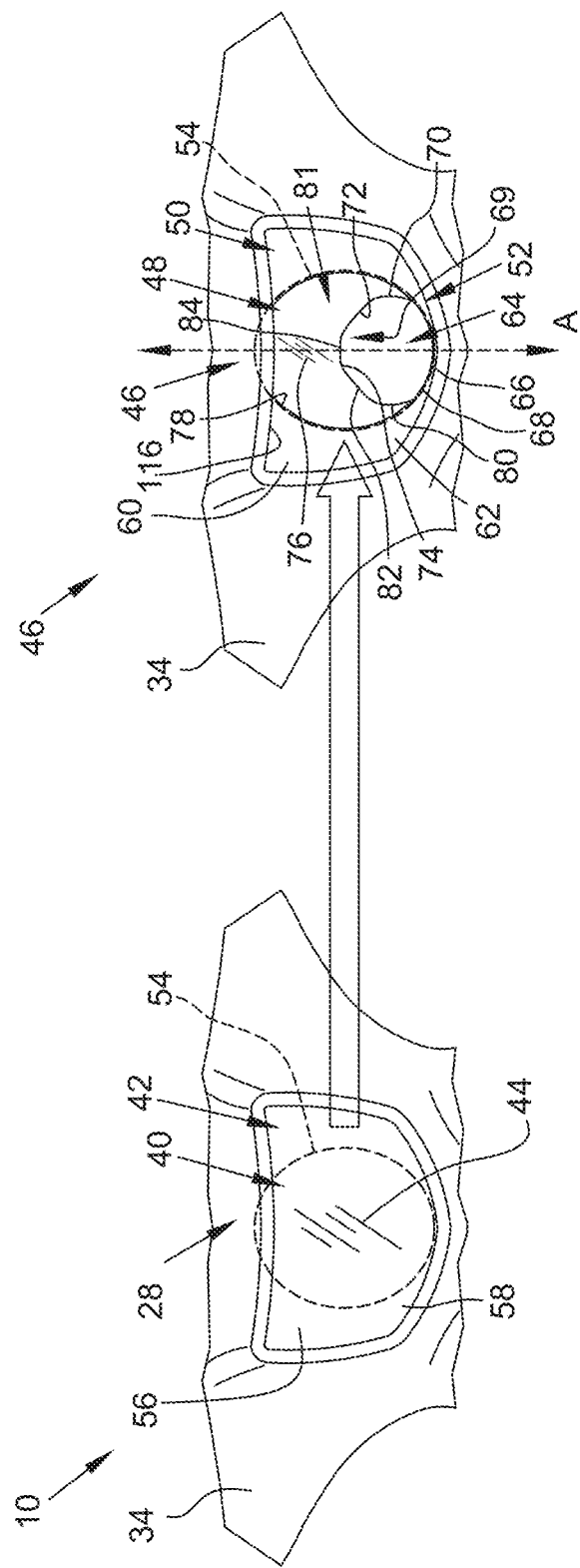
FIG. 2A is a front view of a vehicle having a prior art main lighting assembly.
FIG. 2B is a front view of a vehicle having one embodiment of a main lighting assembly according to the present disclosure.

Referring now to FIG. 2A, a front view of a main lighting assembly 28 used in a conventional vehicle is shown along with the front fairing 34. As shown, a typical main lighting assembly 28 may be centered along a centerline A of the vehicle 10 and positioned within the front fairing 34 above the front wheel 14 and below the windshield assembly 36. The main lighting assembly 28 includes a headlight 40 mounted to the frame 12 of the vehicle 10 and a headlight bezel 42 or trim piece that provides a stylized transition between the headlight 40 and the headlight bezel 42. The headlight 40 generally includes a housing (not shown) and a lens 44 enclosing lighting elements that reflect off of the housing and illuminate a forward facing portion of the path of the vehicle 10.

Referring now to FIG. 2B, a main lighting assembly 46 according to the teachings of the present disclosure is shown. In the example shown, the main lighting assembly 46 includes a headlight 48 mounted to the frame 12 of the vehicle, a headlight bezel 50 that substantially surrounds the headlight 48 an is supported within an opening 116 of the front fairing 34, and a radar sensor assembly 52. As shown, the main lighting assembly 46 (including the headlight 48 and the radar sensor assembly 52) occupies the same envelope 54 as was occupied by the main lighting assembly 46 depicted in FIG. 2A. The radar sensor assembly 52, in this example, includes a radar unit (not shown in FIG. 2B) and a radar mount as is described in further detail below.

The headlight bezel 42 of FIG. 2A includes side walls 56 that have tapering ends 58 which converge at the centerline A of the vehicle 10. The headlight bezel 50 in FIG. 2B similarly includes side walls 60 with tapering ends 62 that substantially converge at the centerline A. The headlight bezel 50, however, also includes a radar cover 64 that extends upwardly from the tapering ends 62 and covers the radar unit of the radar sensor assembly 52. It should be understood that the radar cover 64 is made of material such as a molded polycarbonate with a hard coat applied for scratch resistance that does not interfere with the operation of the radar unit.

In the depicted example, the radar cover 64 includes a substantially flat lower edge 66, a pair of angled lower edges 68 extending from the flat lower edge 66, an upper protrusion 69 including a pair of substantially vertical edges 70 that extend upwardly from the angled lower edges 68, a pair of upper angled edges 72 that extend from the vertical edges 70 and a substantially flat upper edge 74 extending between the angled upper edges 72.

The headlight 48 is shaped to conform to the shape of the radar cover 64 while remaining within the envelope 54 to present, together with the radar cover 64, an appearance of a typical headlight such as headlight 40 of FIG. 2A. As such, the headlight lens 76 (and housing behind it—not shown) includes an upper semi-arcuate edge, more specifically an upper semi-circular edge 78, a pair of substantially vertical edges 80 extending from the upper semi-circular edge 78, and a lower recess 81 including a pair of lower angled edges 82 extending upwardly and inwardly from the vertical edges 80, and a lower edge 84 extending between the lower angled edges 82. In this manner, the vertical edges 80 of the lens 76 are substantially contiguous with the vertical edges 70 of the radar cover 64, the angled lower edges 82 of the lens 76 are substantially contiguous with the angled upper edges 72 of the radar cover 64, and the lower edge 84 of the lens 76 is substantially contiguous with the upper edge 74 of the radar cover 64.

Figure 3:
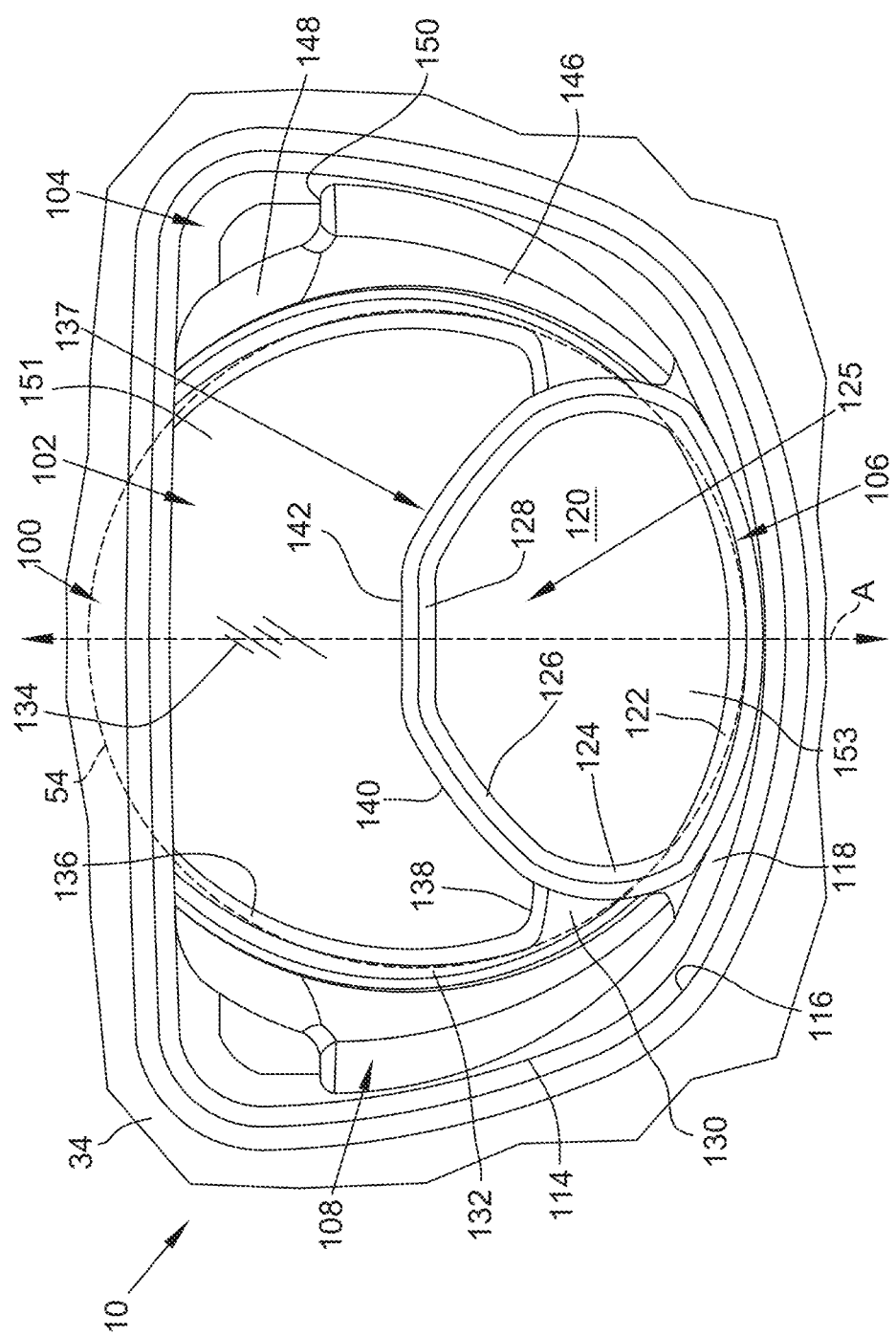
FIGS. 3 and 4 are front views of a vehicle having a main lighting assembly according to another embodiment of the present disclosure.
Figure 4:
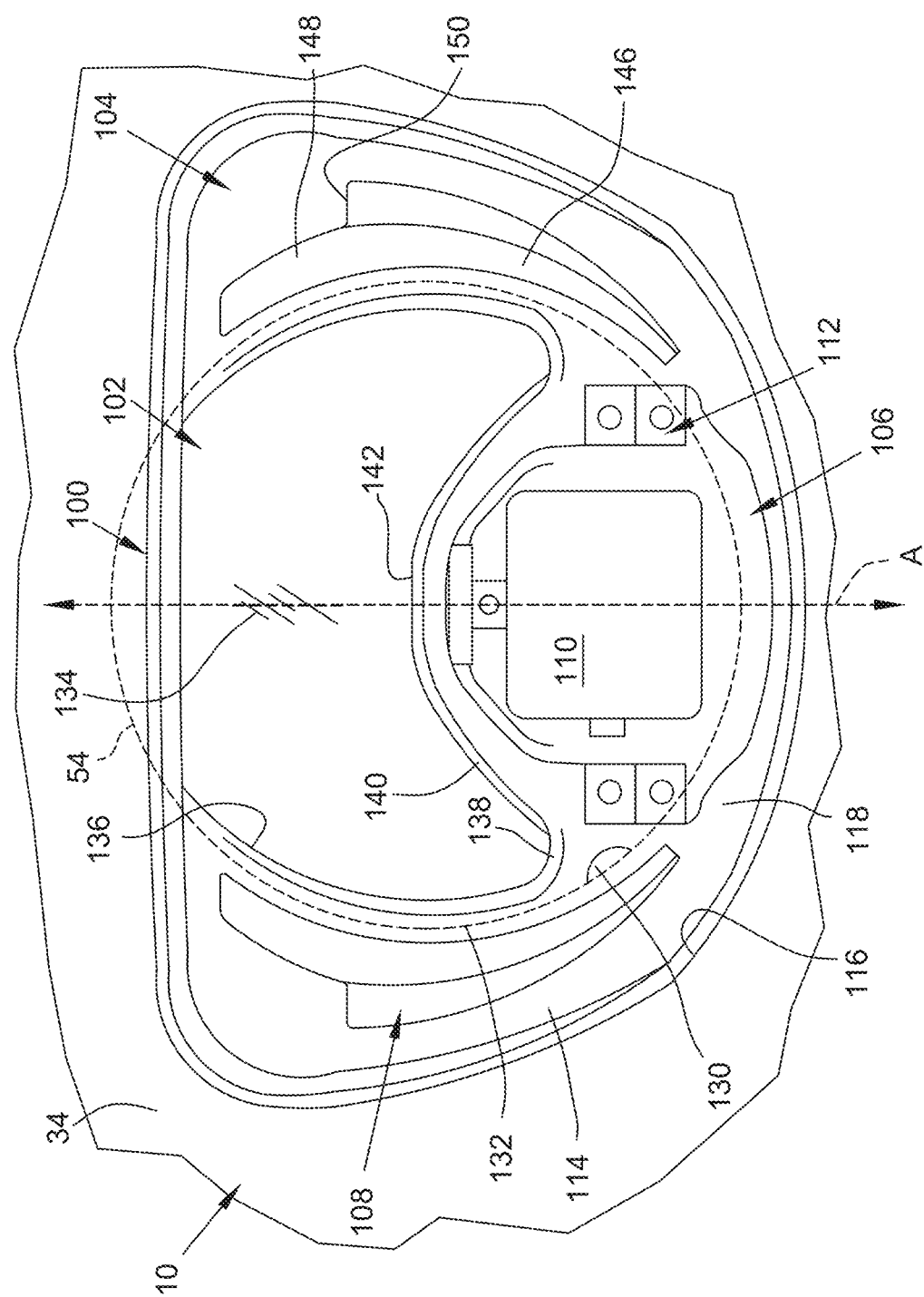

Referring now to FIGS. 3 and 4, another embodiment of a main lighting assembly according to the present disclosure is shown. The main lighting assembly 100 is also centered along the centerline A of the vehicle 10 and positioned within the front fairing 34 above the front wheel 14 and below the windshield assembly 36. The main lighting assembly 28 includes a headlight 102 mounted to the frame 12 of the vehicle 10 and a headlight bezel 104. The headlight 40 generally includes a housing (not shown) and a lens 106 enclosing lighting elements that reflect off of the housing and illuminate a forward facing portion of the path of the vehicle 10. The main lighting assembly 100 also includes a radar sensor assembly 106 and optional position lights 108. As shown, the main lighting assembly 102 (including the headlight 102 and the radar sensor assembly 106) again occupies the traditional envelope 54 of a standard headlight, such as that depicted in FIG. 2A. While the traditional headlight envelope 54 described herein is substantially circular in shape, it should be understood that other envelope shapes may be used including, and not limited to, generally rounded or arcuate (for example, oval-shaped or elliptical), semi-circular, triangular, square, rectangular or any other suitable shape. Moreover, it should be understood that while the main lighting assemblies described herein are positioned on and substantially symmetrical about the centerline A of the vehicle 10, the assemblies may, in certain embodiments, be positioned off-center and/or asymmetrical in shape.

As best shown in FIG. 4, the radar assembly 106 includes a radar unit 110 and a radar mount 112 which is attached to a bracket (not shown) that connects the headlight 102 to the frame 12 of the vehicle 12.

The headlight bezel 104 substantially surrounds the headlight 48 and is supported within the opening 116 of the front fairing 34. The headlight bezel 104 includes outer side walls 114 that extend about the perimeter of an opening 116 formed in the front fairing 34. The side walls 114 have tapering ends 118 which converge at the centerline A of the vehicle 10. The headlight bezel 104 also includes a radar cover 120 that extends upwardly from the tapering ends 118 and covers the radar unit 110 of the radar sensor assembly 106. It should be understood that the radar cover 120 is made of material that does not interfere with the operation of the radar unit 110.

In the depicted example, the radar cover 120 includes a curved lower edge 122, a pair of curved vertical edges 124 extending from the curved lower edge 122, an upper protrusion 125 including a pair of upper angled edges 126 that extend from the vertical edges 124 and a substantially flat upper edge 128 extending between the upper angled edges 126. In this example, the headlight bezel 104 also includes partially triangular forward walls 130 extending laterally outwardly relative to the centerline A from the curved vertical edges 124 of the radar cover 120. A pair of curved inner wall segments 132 of the headlight bezel 104 extend upwardly from the forward walls 130 to the upper portion of the headlight bezel 104.

The headlight 102 is shaped to conform to the shape of the radar cover 120 while remaining within the envelope 54 defined by the curved lower edge 122 of the headlight bezel 104, the forward walls 130 of the headlight bezel 104, portions of the radar cover 120 and the curved inner wall segments 132 of the headlight bezel 104 to present an appearance of a typical headlight such as headlight 40 of FIG. 2A. As such, the headlight lens 134 (and housing behind it—not shown) includes an upper semi-circular edge 136, a pair of lower edges 138 extending from the upper semi-circular edge 136, a lower recess 137 including a pair of lower angled edges 140 extending upwardly and inwardly from the lower edges 138, and a central lower edge 142 extending between the lower angled edges 140. In this manner, the lower edges 138 of the lens 134 are substantially contiguous with the forward walls 130 of the headlight bezel 104, the lower angled edges 140 of the lens 134 are substantially contiguous with the upper angled edges 126 of the radar cover 120, and the central lower edge 142 of the lens 134 is substantially contiguous with the upper edge 128 of the radar cover 120.

The main lighting assembly 100 of this embodiment further includes a pair of position lights 108 situated between the outer side walls 114, the forward walls 130 and the curved inner wall segments 132 of the headlight bezel 104. The position lights 108 may be required in certain jurisdictions as corner markers of the vehicle, but in other jurisdictions may be included as auxiliary or signature lights for styling. In certain embodiments, the position lights 108 are incorporated into the headlight 102. The position lights 108 each include a lower portion 146 that tapers along the curve defined by the outer side wall 114, the forward walls 130 and the inner wall segments 132 of the headlight bezel 104. The position lights 108 further include an upper portion 148 that extend upwardly from the lower portion 146 along the inner wall segments 132 of the headlight bezel 104. An outwardly projecting step 150 extends from the upper portion 148 toward the outer side wall 114 of the headlight bezel 104 at the transition between the lower portion 146 and the upper portion 148 of the position lights 108.

It should be understood that while the embodiments described herein depict the radar sensing assembly situated below the headlight, the teachings of the present disclosure may readily be modified to position the radar sensing assembly within or above the headlight. The present disclosure is intended to encompass any such mounting location of the radar sensing assembly that is within the envelope described herein.

Referring now to FIG. 3, the headlight lens 134 includes a convex outer surface 151 and the radar cover 120 includes a convex outer surface 153. The curvature of the convex outer surface 151 of the headlight lens 134 is substantially contiguous with the curvature of the convex outer surface 153 of the radar cover 120. In other words, when viewed from the side, the outer surface 151 of the lens 134 substantially conforms to the outer surface 153 of the radar cover 120 giving the appearance of one substantially continuous surface.

It should be understood that many headlights need to be aimed with changes in, for example, the weight of occupant (s) of the vehicle. Accordingly, the main lighting assembly including the radar sensor assemblies disclosed herein may also be readily configured for aiming. Moreover, the main lighting assembly and/or the radar sensor assembly may be modified to adapt to the orientation of the vehicle such as during cornering as disclosed in U.S. Pat. No. 11,465,705, the entire contents of which being expressly incorporated herein by reference. Finally, the teachings of the present disclosure are applicable to vehicles that use other types of visual or proximity sensors, such as a camera, LIDAR or other device, instead of a radar assembly.

Lighting assemblies according to the present disclosure may advantageously facilitate ease of aligning/positioning components and assemblies relative to each other, and/or integrating different types of lights and sensors based on the application of the vehicle. Relatedly, lighting assemblies according to the present disclosure may advantageously facilitate customization, for example use of lenses with varying degrees of transparency for use with different types of lights and sensors.

The following items are further variations and examples of the embodiments described with reference to the figures.

Example 1. A main lighting assembly for a vehicle may comprise a headlight mounted to a frame of the vehicle. The headlight may include a lens. The lighting assembly may further comprise a headlight bezel substantially surrounding the headlight and supported within an opening of a front fairing of the vehicle and a sensor assembly. The sensor assembly may be positioned in proximity to the headlight lens and between the headlight bezel and the headlight to sense objects in front of the vehicle. The sensor assembly may include a forward-facing sensor unit mounted to the vehicle and positioned behind a sensor cover. The headlight lens may include a semi-arcuate edge and a recess. The sensor cover may include a protrusion that is substantially contiguous with the recess. The headlight lens and the sensor cover may define an arcuate envelope.

Example 2. The main lighting assembly of Example 1, wherein the headlight lens may define a first portion within the envelope and the radar cover may define a second portion within the envelope. The radar cover may generally extend to a center point of the envelope.

Example 3. The main lighting assembly of Example 1, wherein the semi-arcuate edge may be an upper semi-arcuate edge, the recess may be a lower recess, and the protrusion may be an upper protrusion.

Example 4. The main lighting assembly of Example 1, may further comprise a pair of position lights positioned between an outer side wall of the headlight bezel and curved inner wall segments of the headlight bezel.

Example 5. The main lighting assembly of Example 4, wherein the pair of position lights may be positioned outside the substantially circular envelope.

Example 6. The main lighting assembly of Example 5, wherein each of the pair of position lights may include a lower portion that tapers along a curved defined by an outer wall of the headlight bezel and an upper portion that extends from the lower portion at a step between the lower portion and the upper portion.

Example 7. The main lighting assembly of Example 1, wherein the headlight lens and the sensor cover may be symmetric about a centerline of the vehicle.

Example 8. The main lighting assembly of Example 1, wherein the headlight bezel may include an outer wall that surrounds the headlight. The outer wall may include tapering ends adjacent a curved lower edge of the sensor cover.

Example 9. The main lighting assembly of Example 1, wherein the headlight bezel may include an outer wall that surrounds the headlight. A pair of curved inner wall segments that may be substantially contiguous with the semi-arcuate edge of the headlight lens.

Example 10. The main lighting assembly of Example 1, wherein the headlight bezel may include a pair of substantially triangular forward walls extending from the curved inner wall segments. The substantially triangular forward walls may be positioned adjacent corresponding lower edges of the headlight lens and corresponding curved vertical edges of the sensor cover.

Example 11. The main lighting assembly of Example 1, wherein the headlight lens may include a convex outer surface and the sensor cover may include a convex outer surface. The convex outer surface of the headlight lens may have a curvature that is substantially continuous with a curvature of the convex outer surface of the sensor cover.

Example 12. The main lighting assembly of Example 1, wherein the forward-facing sensor unit may be a radar unit.

Example 13. A main lighting assembly for a vehicle may comprise a headlight including a lens and a sensor assembly. The sensor assembly may be positioned below the headlight lens and may include a forward-facing sensor unit positioned behind a sensor cover to sense objects in front of the vehicle. The headlight lens may include a lower recess and the sensor cover may include an upper protrusion that is substantially contiguous with the lower recess. The headlight lens and the sensor cover may be positioned within an opening of a front fairing of the vehicle and may define a substantially circular envelope.

Example 14. The main lighting assembly of Example 13, wherein the lower recess of the headlight lens may include a pair of lower edges extending from an upper semi-circular edge of the headlight lens, a pair of lower angled edges extending from the pair of lower edges and a central lower edge.

Example 15. The main lighting assembly of Example 14, wherein the upper protrusion of the sensor cover may include a pair of upper angled edges and a substantially flat upper edge extending between the upper angled edges. The upper angled edges may be substantially contiguous with the lower angled edges of the headlight lens and the substantially flat upper edge being substantially contiguous with the central lower edge of the headlight lens.

Example 16. The main lighting assembly of Example 15, wherein the headlight lens and the sensor cover may be symmetric about a centerline of the vehicle.

Example 17. The main lighting assembly of Example 13, may further comprise a headlight bezel including an outer wall that substantially surrounds the headlight. The outer wall may include tapering ends adjacent a curved lower edge of the sensor cover.

Example 18. The main lighting assembly of Example 13, wherein the headlight lens may include a convex outer surface and the sensor cover may include a convex outer surface. The convex outer surface of the headlight lens may have a curvature that is substantially continuous with a curvature of the convex outer surface of the sensor cover.

Example 19. The main lighting assembly of Example 13, wherein the forward-facing sensor unit may be a radar unit.

Example 20. A main lighting assembly for a vehicle may comprise a headlight including a lens and a sensor assembly. The sensor assembly may be positioned above the headlight lens and may include a forward-facing sensor unit positioned behind a sensor cover to sense objects in front of the vehicle. The headlight lens may include an upper recess and the sensor cover may include an lower protrusion that is substantially contiguous with the upper recess. The headlight lens and the sensor cover may be positioned within an opening of a front fairing of the vehicle and may define a substantially circular envelope.

Example 21. A lighting assembly for a vehicle may comprise a light including a lens and a sensor assembly. The sensor assembly may be positioned adjacent the light lens and may include a forward-facing sensor unit positioned behind a sensor cover to sense objects the vehicle. The light lens may include a recess and the sensor cover may include a portion that is substantially contiguous with the recess. The light lens and the sensor cover may be positioned within an opening of a front fairing of the vehicle and may define a substantially circular envelope.

While this disclosure has been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A main lighting assembly for a vehicle, comprising:
a headlight mounted to a frame of the vehicle, the headlight including a lens;
a headlight bezel substantially surrounding the headlight and supported within an opening of a front fairing of the vehicle; and
a sensor assembly positioned in proximity to the headlight lens and between the headlight bezel and the headlight to sense objects in front of the vehicle, the sensor assembly including a forward-facing sensor unit mounted to the vehicle and positioned behind a sensor cover;
wherein the headlight lens includes a semi-arcuate edge and a recess including a pair of lower angled edges and the sensor cover includes a protrusion that is substantially contiguous with the recess including a pair of upper angled edges, the upper angled edges being substantially contiguous with the lower angled edges of the headlight lens; and
wherein the headlight lens and the sensor cover define an arcuate substantially circular envelope.

2. The main lighting assembly of claim 1, wherein the headlight lens defines a first portion within the envelope and the sensor cover defines a second portion within the envelope, and the sensor cover generally extends to a center point of the envelope.

3. The main lighting assembly of claim 1, wherein the semi-arcuate edge is an upper semi-arcuate edge, the recess is a lower recess, and the protrusion is an upper protrusion.

4. The main lighting assembly of claim 1, further comprising a pair of position lights positioned between an outer side wall of the headlight bezel and curved inner wall segments of the headlight bezel.

5. The main lighting assembly of claim 4, wherein the pair of position lights are positioned outside the substantially circular envelope.

6. The main lighting assembly of claim 5, wherein each of the pair of position lights includes a lower portion that tapers along a curved defined by an outer wall of the headlight bezel and an upper portion that extends from the lower portion at a step between the lower portion and the upper portion.

7. The main lighting assembly of claim 1, wherein the headlight lens and the sensor cover are symmetric about a centerline of the vehicle.

8. The main lighting assembly of claim 1, wherein the headlight bezel includes an outer wall that surrounds the headlight, the outer wall including tapering ends adjacent a curved lower edge of the sensor cover.

9. The main lighting assembly of claim 1, wherein the headlight bezel includes an outer wall that surrounds the headlight, and a pair of curved inner wall segments that are substantially contiguous with the semi-arcuate edge of the headlight lens.

10. The main lighting assembly of claim 9, wherein the headlight bezel includes a pair of substantially triangular forward walls extending from the curved inner wall segments, the substantially triangular forward walls being positioned adjacent corresponding lower edges of the headlight lens and corresponding curved vertical edges of the sensor cover.

11. The main lighting assembly of claim 1, wherein the headlight lens includes a convex outer surface and the sensor cover includes a convex outer surface, the convex outer surface of the headlight lens has a curvature that is substantially continuous with a curvature of the convex outer surface of the sensor cover.

12. The main lighting assembly of claim 1, wherein the forward-facing sensor unit is a radar unit.

13. A main lighting assembly for a vehicle, comprising:
a headlight including a lens; and
a sensor assembly positioned below the headlight lens and including a forward-facing sensor unit positioned behind a sensor cover to sense objects in front of the vehicle;
wherein the headlight lens includes a lower recess including a pair of lower angled edges and the sensor cover includes an upper protrusion that is substantially contiguous with the lower recess including a pair of upper angled edges, the upper angled edges being substantially contiguous with the lower angled edges of the headlight lens; and
wherein the headlight lens and the sensor cover are positioned within an opening of a front fairing of the vehicle and define a substantially circular envelope.

14. The main lighting assembly of claim 13, wherein the lower recess of the headlight lens includes a pair of lower edges extending from an upper semi-circular edge of the headlight lens and a central lower edge extending between the pair of lower angled edges.

15. The main lighting assembly of claim 14, wherein the upper protrusion of the sensor cover includes a substantially flat upper edge extending between the upper angled edges, the substantially flat upper edge being substantially contiguous with the central lower edge of the headlight lens.

16. The main lighting assembly of claim 15, wherein the headlight lens and the sensor cover are symmetric about a centerline of the vehicle.

17. The main lighting assembly of claim 13, further comprising a headlight bezel including an outer wall that substantially surrounds the headlight, the outer wall including tapering ends adjacent a curved lower edge of the sensor cover.

18. The main lighting assembly of claim 13, wherein the headlight lens includes a convex outer surface and the sensor cover includes a convex outer surface, the convex outer surface of the headlight lens has a curvature that is substantially continuous with a curvature of the convex outer surface of the sensor cover.

19. The main lighting assembly of claim 13, wherein the forward-facing sensor unit is a radar unit.

20. A main lighting assembly for a vehicle, comprising:
a headlight including a lens; and
a sensor assembly positioned above the headlight lens and including a forward-facing sensor unit positioned behind a sensor cover to sense objects in front of the vehicle;
wherein the headlight lens includes an upper recess including a pair of upper angled edges and the sensor cover includes a lower protrusion that is substantially contiguous with the upper recess including a pair of lower angled edges, the lower angled edges being substantially contiguous with the upper angled edges of the headlight lens; and
wherein the headlight lens and the sensor cover are positioned within an opening of a front fairing of the vehicle and define a substantially circular envelope.

21. A lighting assembly for a vehicle, comprising:
a light including a lens; and
a sensor assembly positioned adjacent the light lens and including a forward-facing sensor unit positioned behind a sensor cover to sense objects the vehicle;
wherein the light lens includes a recess including a pair of angled edges and the sensor cover includes a portion that is substantially contiguous with the recess including a pair of corresponding angled edges, the corresponding angled edges being substantially contiguous with the angled edges of the light lens; and
wherein the light lens and the sensor cover are positioned within an opening of a front fairing of the vehicle and define a substantially circular envelope.

* * * * *